UNITED STATES PATENT OFFICE.

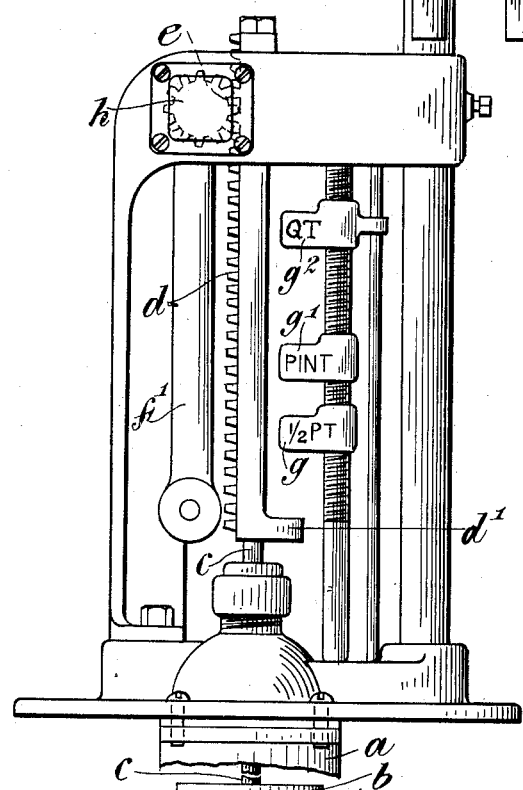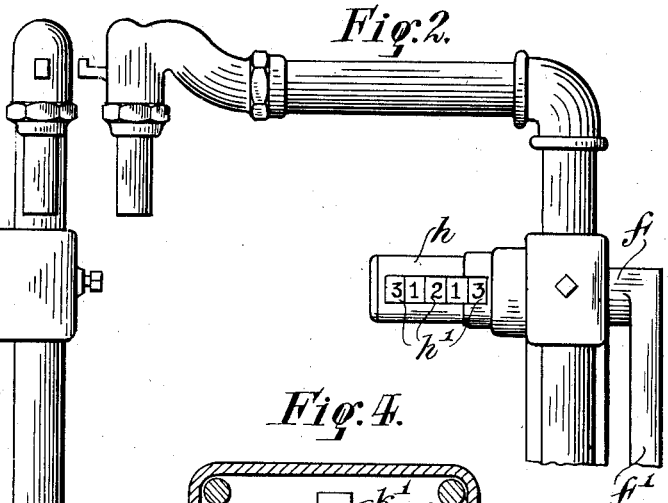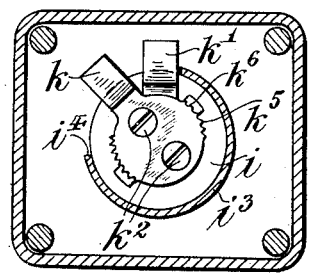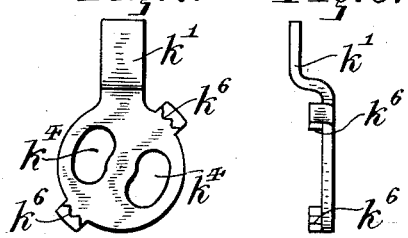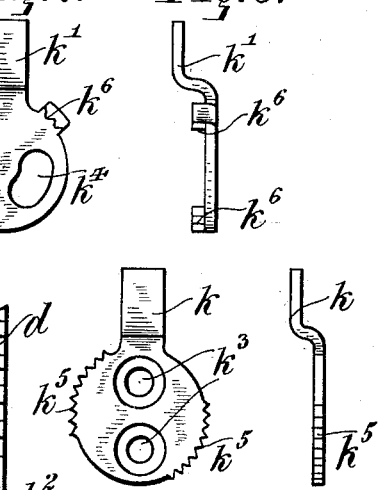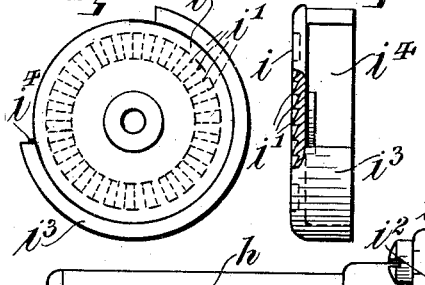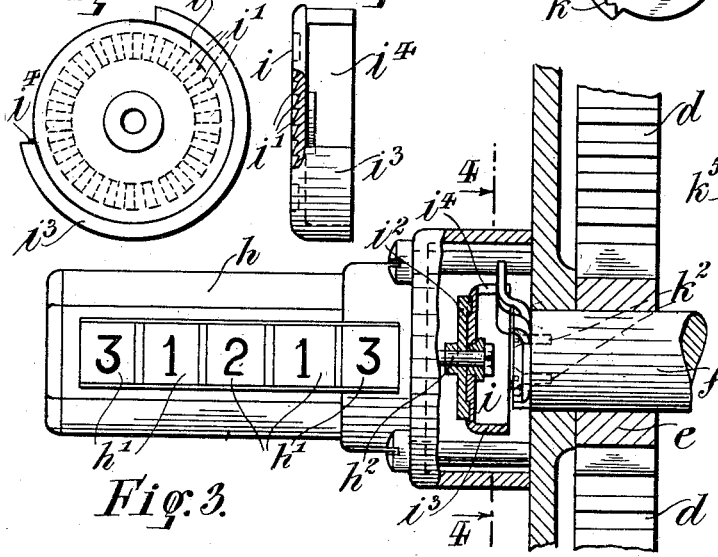

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

COMPENSATING DEVICE FOR OIL-PUMP COUNTERS, ETC.

1,411,984. Specification of Letters Patent. Patented Apr. 4, 1922.

Application filed May 6, 1921. Serial No. 467,302.

*To all whom it may concern:*

Be it known that I, CURTIS HUSSEY VEEDER, a citizen of the United States, residing at 17 Marshall Street, in the city of Hartford of the State of Connecticut, have invented certain new and useful Improvements in Compensating Devices for Oil-Pump Counters, Etc., of which the following is a specification, reference being had to the accompanying drawing, forming a part hereof.

Measuring and registering pumps, such as are commonly used at automobile filling stations and garages in the dispensing of oil and for other like purposes commonly have their cylinders formed of drawn brass tubing. Such tubing is not accurately calibrated but varies in diameter to such an extent that the quantity of oil dispensed for a given length of plunger stroke may vary materially in different pumps. To secure delivery of the proper quantity of oil the length of the plunger stroke is regulated, the position of a stop which limits the stroke being adjusted so that the full stroke of the plunger shall deliver the proper quantity of oil. The register or counter by which the number of unit volumes of oil dispensed is registered is actuated by some moving part of the pump mechanism, usually by the driving shaft on which is mounted the pinion which engages the rack connected to the plunger. Variation in the length of stroke of the plunger to compensate for variations in the diameter of the pump cylinder may therefore affect the operation of the register, causing it to be advanced too far or not far enough as the case may be. It is the object of this invention to provide a compensating transmitting device between the register or counter and that member of the pump mechanism which actuates the counter, so that when the length of stroke of the plunger necessary to deliver a measured quantity of oil has been determined and limited accordingly, the compensating device can be adjusted so that the register or counter shall be advanced through one step and no more and such unit of oil dispensed. The invention will be more fully explained hereinafter with reference to the accompanying drawing in which it is illustrated and in which—

Figure 1 is a view in elevation of so much of an oil dispensing apparatus as is necessary to enable the application of the invention to be understood.

Figure 2 is a view of the upper portion of the same as seen from the left hand in Figure 1.

Figure 3 is a detail view with the counter in elevation and the actuating device in section, the scale of the figure being larger than that of Figures 1 and 2.

Figure 4 is a detail view in section on the plane indicated by the broken line 4—4 of Figure 3, looking in the direction of the arrows.

Figures 5 and 6 are detail views of the ratchet mechanism through which the counter is driven.

Figures 7 and 8 are detail views of one member of the compensating device.

Figures 9 and 10 are detail views of the other member of the compensating device.

The dispensing apparatus and the counter, except so far as concerns the compensating devices by which the counter is actuated, may be of any usual or suitable construction. In the construction shown in the drawing the pump cylinder $a$ receives a plunger $b$, the stem $c$ of which carries a rack $d$. With the latter engages a pinion $e$ on the shaft $f$ which carries the crank $f'$ by which, through the pinion $e$ and rack $d$, the plunger $b$ is reciprocated for the dispensing of the measured quantity of oil. Stops $g$, $g'$, $g^2$, are arranged to co-operate with a lug $d'$ of the rack $d$ for the purpose of limiting the stroke of the pump plunger, being adjustable so that the stroke of the plunger may be regulated, for each unit, to deliver the exact quantity of oil.

The counter $h$ is shown as having its several number wheels $h'$ mounted on a common axis and actuated by a shaft $h^2$ which receives motion from the pump shaft $f$ through a cup $i$ which is mounted loosely on the shaft $h^2$ and is formed with ratchet teeth $i'$, and a pawl member $i^2$ which is fixed on the shaft $h^2$, this arrangement permitting the counter to be actuated by movement of the pump plunger in one direction and to remain at rest during the movement of the pump plunger in the opposite direction. The ratchet cup $i$ has a flange $i^3$ which has a wide notch $i^4$ for engagement with a driving arm which is secured to the shaft $f$. If the driving arm fitted closely in the notch of the ratchet cup there could be no compensation for differences in length of stroke of the plunger, but the advancement of the ratchet cup and therefore the advancement of the units wheel of the register would be in proportion to the length of stroke of the plunger. So if the driving arm fitted loosely in the notch, with freedom for lost motion, there would still be no compensation in transmission of movement as between the two. In accordance with the present invention, therefore, the width of one of these members is made adjustable with respect to the width of the other, so that although there may be lost motion at one end of the stroke the point of effective engagement of the one with the other in the forward movement of the driving arm can be adjusted so that the counter shall be advanced one step and no more for each unit stroke of the plunger. In the construction shown the notch $i^4$ is fixed in width and the driving arm is adjustable in width, the driving arm consisting of two parts or members $k$, $k'$ which are adjustable with respect to each other to vary the outside width of the combined arms. Both members are secured to the end of the shaft $f$ as by screws $k^2$ which pass through counter sunk holes $k^3$ in the member $k$ and through elongated holes $k^4$ in the member $k'$, the member $k'$ being therefore adjustable with respect to the member $k$ to vary the time of contact of the combined driving arm with the end of the flange $i^3$. The body of each member $k$, $k'$ is disc-like, and the two members are formed with interengaging devices such as peripheral teeth $k^5$ or the member $k$ to be engaged by toothed lugs $k^6$ on the member $k'$. When the screws $k^2$ are loosened the two members $k$, $k'$ can be separated slightly and the member $k$ can be rotated with respect to the member $k'$ to adjust the relative positions of the two arms and the two members can be secured in adjusted position and to the shaft $f$ by tightening the screws $k^2$. Preferably the angular spacing of the teeth $k^5$ corresponds to the angular spacing of the ratchet teeth $i'$ of the ratchet teeth $i$ so that adjustment of the arm corresponds to the spacing of the ratchet teeth. All parts are preferably so made that for standard construction engagement of the toothed lugs $k^6$ will be effected at about the middle of the series of teeth $k^5$, thus permitting adjustment of two or three notches each way to compensate for volumetric capacity of the pump cylinder greater or less than the standard. It will be obvious that when the length of stroke of the pump plunger is increased the lost motion in the connection between the pump mechanism and the counter will be increased also so that registration will continue to be correct. It will be understood that various changes in detail of construction and arrangement may be made to suit different conditions of use and that the invention, except as pointed out in the accompanying claims, is not limited to the precise construction and arrangement shown and described herein.

I claim as my invention:

1. The combination with a pump for dispensing liquids and a counter actuated by movement of the pump mechanism, of a compensating transmitting device between the pump mechanism and the counter, comprising a notched member and a co-operating arm consisting of two members adjustable with respect to each other to vary the combined width of the two members.

2. The combination with a pump for dispensing liquids and a counter actuated by movement of the pump mechanism, of a compensating transmitting device between the pump mechanism and the counter, comprising a driving arm consisting of two members having toothed engagement with each other to permit rotary adjustment of the two members and adjustment of the width of the driving arm, means to secure the two members together, and a flanged driven member having a notch in its flange for co-operation with the driving arm.

3. The combination with a pump for dispensing liquids and a counter actuated by movement of the pump mechanism, of a compensating transmitting device between the pump mechanism and the counter, comprising a flanged and notched driven member having a ratchet engagement with the counter and a driving arm for co-operation with said notched flanged driven member.

4. The combination with a pump for dispensing liquids and a counter actuated by movement of the pump mechanism, of a compensating transmitting device between the pump mechanism and the counter, comprising a notched flanged driven member having a ratchet and pawl engagement with the counter and a driving arm consisting of two members relatively adjustable to vary the combined width of the driving arm.

This specification signed this 4 day of May A. D. 1921.

CURTIS HUSSEY VEEDER.